(12) United States Patent
Goodman et al.

(10) Patent No.: US 6,675,602 B2
(45) Date of Patent: Jan. 13, 2004

(54) PORTABLE CONDITIONED STORAGE UNIT

(76) Inventors: Teresa B. Goodman, 2300 Downing Ct., Apt. 2, Albany, GA (US) 31602; Donnell Harden, 2300 Downing Ct., Apt. 2, Albany, GA (US) 31602

( * ) Notice: Subject to any disclaimer, the term of this patent is extended or adjusted under 35 U.S.C. 154(b) by 0 days.

(21) Appl. No.: 10/128,865

(22) Filed: Apr. 24, 2002

(65) Prior Publication Data

US 2002/0194860 A1 Dec. 26, 2002

Related U.S. Application Data

(60) Provisional application No. 60/299,713, filed on Jun. 20, 2001.

(51) Int. Cl.[7] ................................................. F25B 13/00
(52) U.S. Cl. ........................ 62/324.1; 62/457.1; 62/371
(58) Field of Search ............................... 62/371, 457.1, 62/457.9, 324.1, 298, 448

(56) References Cited

U.S. PATENT DOCUMENTS

| | | | |
|---|---|---|---|
| 4,424,687 A | * | 1/1984 | Morgan ........................ 62/457 |
| 4,723,418 A | | 2/1988 | Whitmer, II |
| 4,893,478 A | * | 1/1990 | Kruck et al. .................... 62/126 |
| 5,245,838 A | | 9/1993 | Cavalea, III |
| 5,653,122 A | * | 8/1997 | Anders et al. ................. 62/451 |
| 6,294,721 B1 | * | 9/2001 | Oravetz et al. .............. 136/242 |
| 6,378,324 B1 | * | 4/2002 | Percy et al. ................... 62/448 |

FOREIGN PATENT DOCUMENTS

GB      2170582 A   *   8/1986

* cited by examiner

Primary Examiner—Melvin Jones
(74) Attorney, Agent, or Firm—Brian D. Bellamy

(57) ABSTRACT

A portable conditioned storage unit includes a platform transportable on a trailer or vehicle having a storage box thereon. The interior of the storage box is insulated and suitable for storing wild game or other goods within a cage situated within the storage box in spaced relation to permit the circulation of conditioned air about the cage. A removable modular unit having standard air conditioning components operates in attachment to the storage box to heat and cool the insulated interior and goods within the cage. The storage unit is powered by an external electrical source or built-in electrical generator.

12 Claims, 5 Drawing Sheets

PORTABLE CONDITIONED STORAGE UNIT

DOMESTIC PRIORITY CLAIM

The priority of U.S. Provisional Application No. 60/299,713, filed Jun. 20, 2001 is claimed.

BACKGROUND OF THE INVENTION

1. Field of the Invention

The present invention relates to a portable conditioned storage unit useful for cooling, heating, or freezing, and more particularly to a versatile cold storage unit designed for use by hunters, fishermen, and other for storing fresh items such as meat, dairy products, vegetables, fish, or flowers.

2. Description of the Prior Art

Many have a need for storing fresh items in quantities of up to 500 pounds. For instance, hunters may dress deer and need a place to store several hundred pounds of dressed meat while continuing to hunt, otherwise the meat may spoil unless transported immediately. Likewise, some farmers have a need for storing fresh vegetables, meat, or dairy products to prepare for transport to market without expending money on a refrigerated truck. Fishermen may like to cold store fish from a day's catch to preserve the fish until transported or cleaned and packaged. And, businesses, such as florists for flowers, have a need for a cost-effective means for storing their fresh products in a portable cold environment.

In the past, large, one-piece refrigerated containers, such as ones sitting on a flatbed trailer, were designed for outdoor events. These type containers would be hauled to a location and unloaded from the trailer using heavy equipment. As disclosed in U.S. Pat. No. 5,245,838 to Cavalea, an improvement on these type containers involved providing a portable refrigeration unit that could be assembled at a remote location without the need for heavy equipment. However, these prior containers were large in size and lacked the versatility required by those such as hunters or fishermen. A need continues to exist for a cold storage unit that can be transported closer to where goods such as fresh meat or the like are to be supplied so that the goods can be immediately stored without losing any of their quality that can be preserved by regulating their temperature.

Standard size and type refrigerators or coolers have been used in the past to solve these needs. However, typical refrigerated containers are too small, cannot be temperature regulated, and cannot freeze quickly or at all. Further, standard freezers are not economical for hunters or like because of size and weight and difficulty in transporting and unloading.

SUMMARY OF THE INVENTION

It is an object of this invention to provide a portable cold storage unit with open cooling and heating system that is temperature regulated to very low temperatures such that the unit may freeze very quickly, and provide ample cold or hot storage space for up to 500 pounds of material such as dressed meat.

In accordance with the invention, the cold storage unit is portable and designed to mount to a platform for loading onto a vehicle or transport by a vehicle. The platform may be provided trailer equipment to be hauled by a vehicle such as an ATV (all terrain vehicle) or loaded onto the bed of a truck or trailer. The invention's cold storage unit includes a modular cooling unit that is separable from the platform and a storage box. By removing the modular cooling unit, it may be exchanged for a different capacity unit. Further, the fluid flow of the cooling unit is reversible such that the cooling unit may also act as a heat pump for heating the storage box. Thus, the cold storage unit may also be used to store cooked meats and the like.

A storage box is connected to a reversible cooling unit and attached to the platform. The box is constructed of wood and supported by aluminum metal struts. The construction of the box provides a light weight storage solution with excellent insulating properties that is also durable for outdoor use and transport.

The platform arrangement of the storage box and modular cooling unit is especially versatile and additional functional features may be added. In particular, the inventor contemplates that optional components including a hot or cold water supply tank, a sink or wash basin, a pair of gas or electric heating elements, a storage compartment for cooking implements, and an ice maker may be added onto the platform along with the storage box and modular cooling unit.

DETAILED DESCRIPTION OF THE INVENTION

Figure 1:
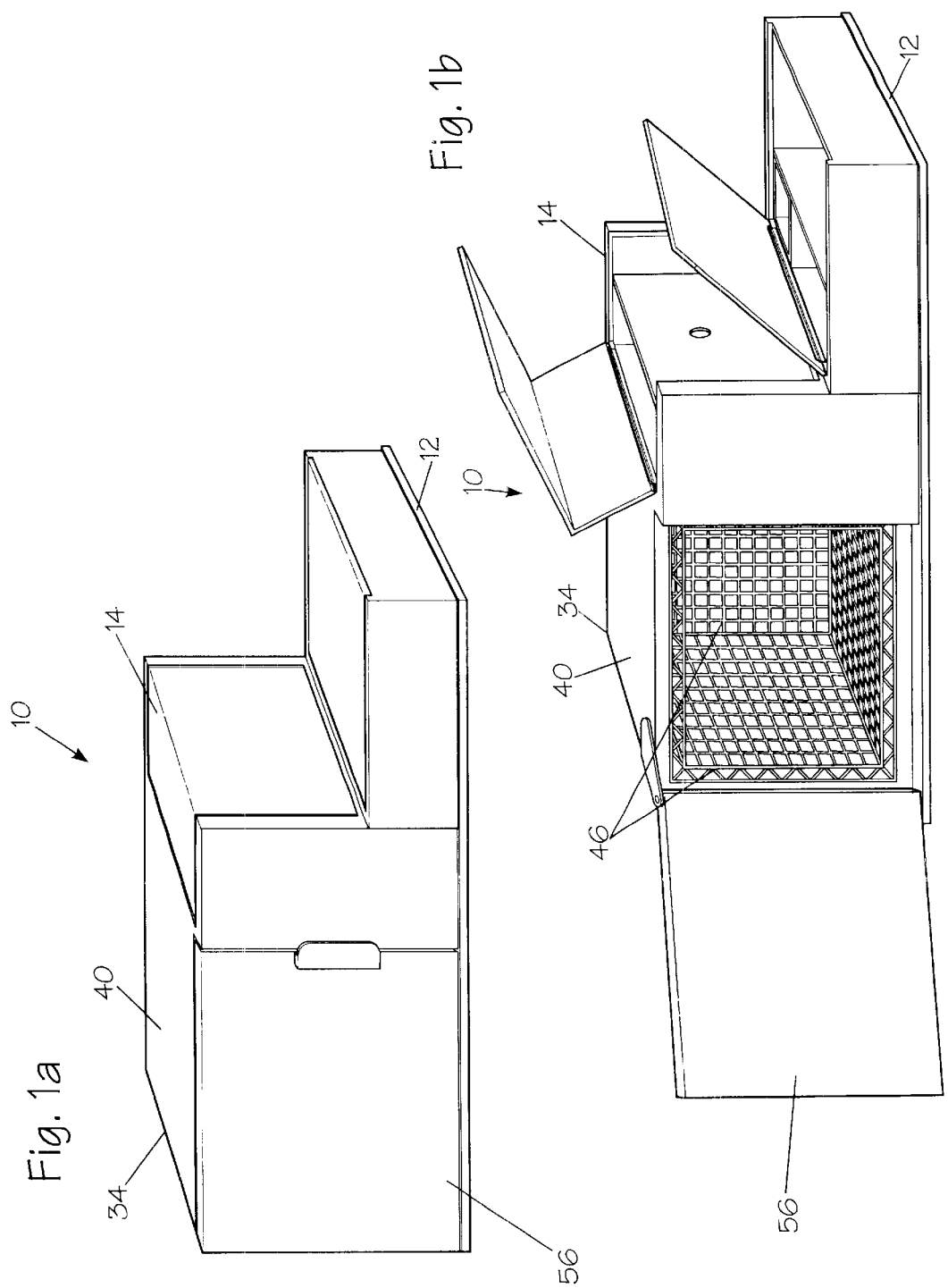
FIG. 1a is a front perspective view of a portable conditioned storage unit made in accordance with the invention.
FIG. 1b is a front perspective view of the portable conditioned storage unit having a front door in an open position.

Referring to the drawings, a preferred embodiment of the invention is disclosed to exemplify the principles of the invention.

A portable conditioned storage unit 10 is illustrated in FIG. 1 and will be referred to generally hereafter as the portable unit. The portable unit 10 is designed to load on a truck or trailer or to be mounted on a platform 12 for transport by vehicles. For example, the portable unit 10 may be small enough and light weight to pull by an ATV or to load in the back of a pickup truck. The portable unit 10 is especially useful by hunter, farmers, and fishermen for transport to some remote woods, field, or fishing boat for use in storing fresh meats.

Figure 4A:
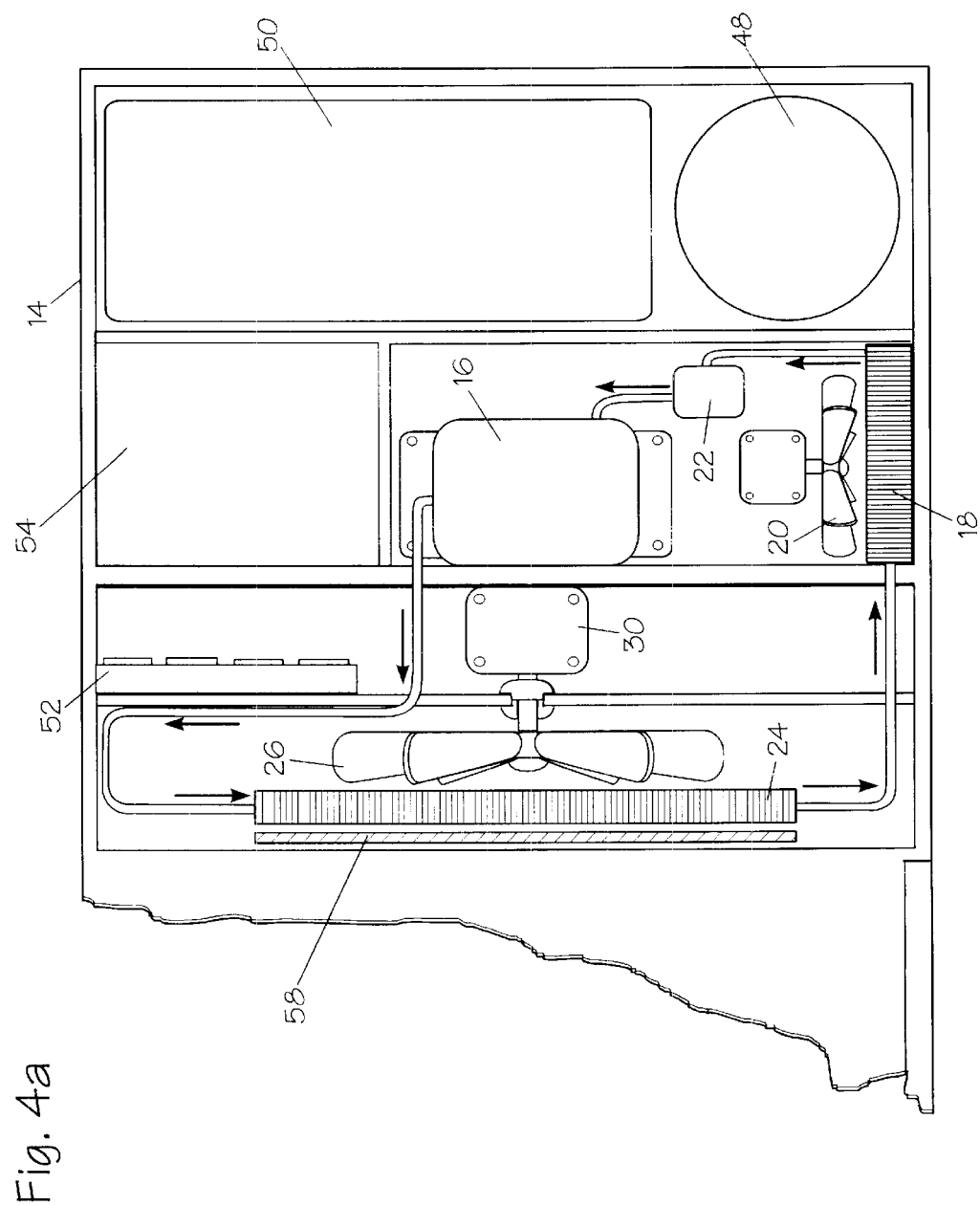
FIG. 4a is an enlarged partial top elevational view of the modular unit and depicting the flow of fluids for cooling a storage box.
Figure 4B:
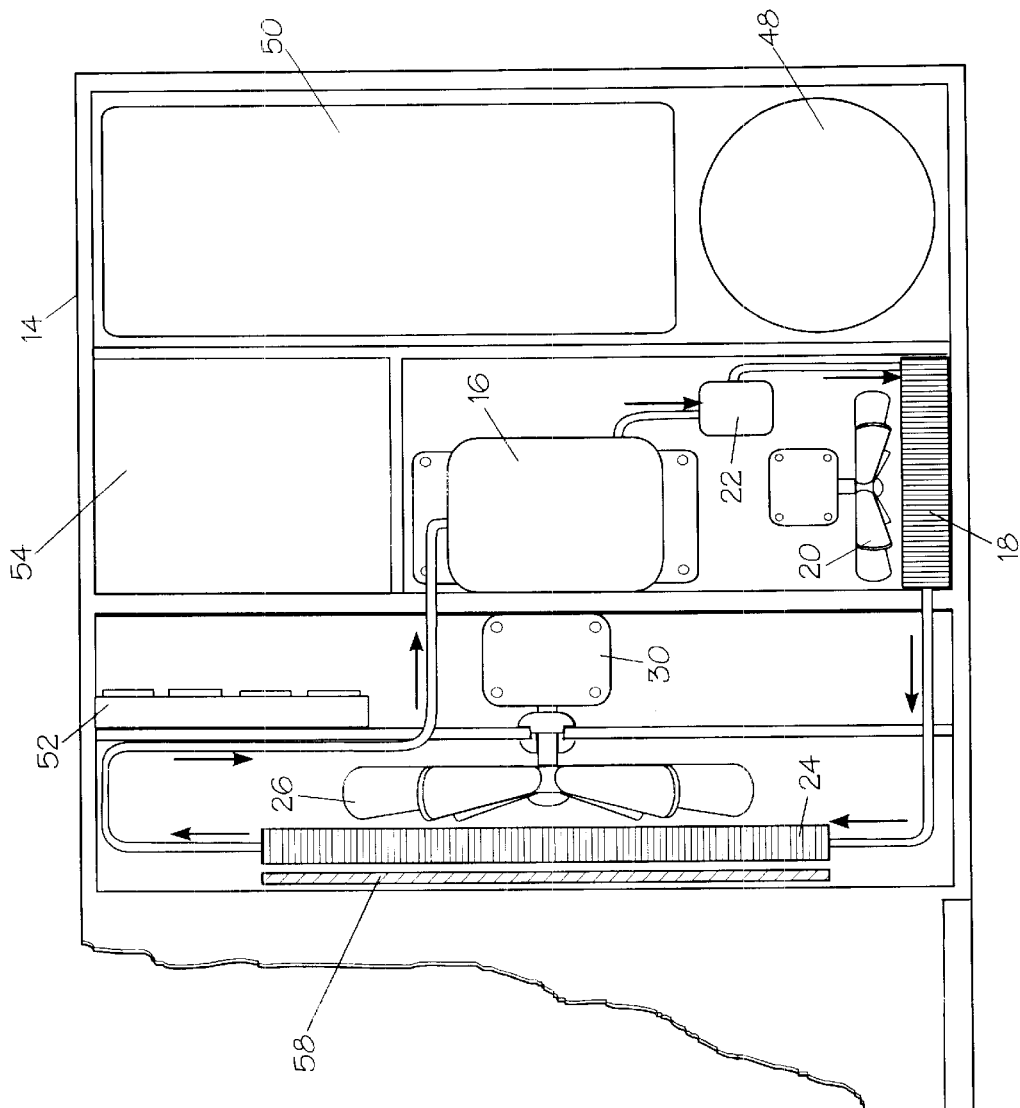
FIG. 4b is an enlarged partial top elevational view of the modular unit including a heating element and depicting the flow of fluids for heating a storage box.
Figure 5:
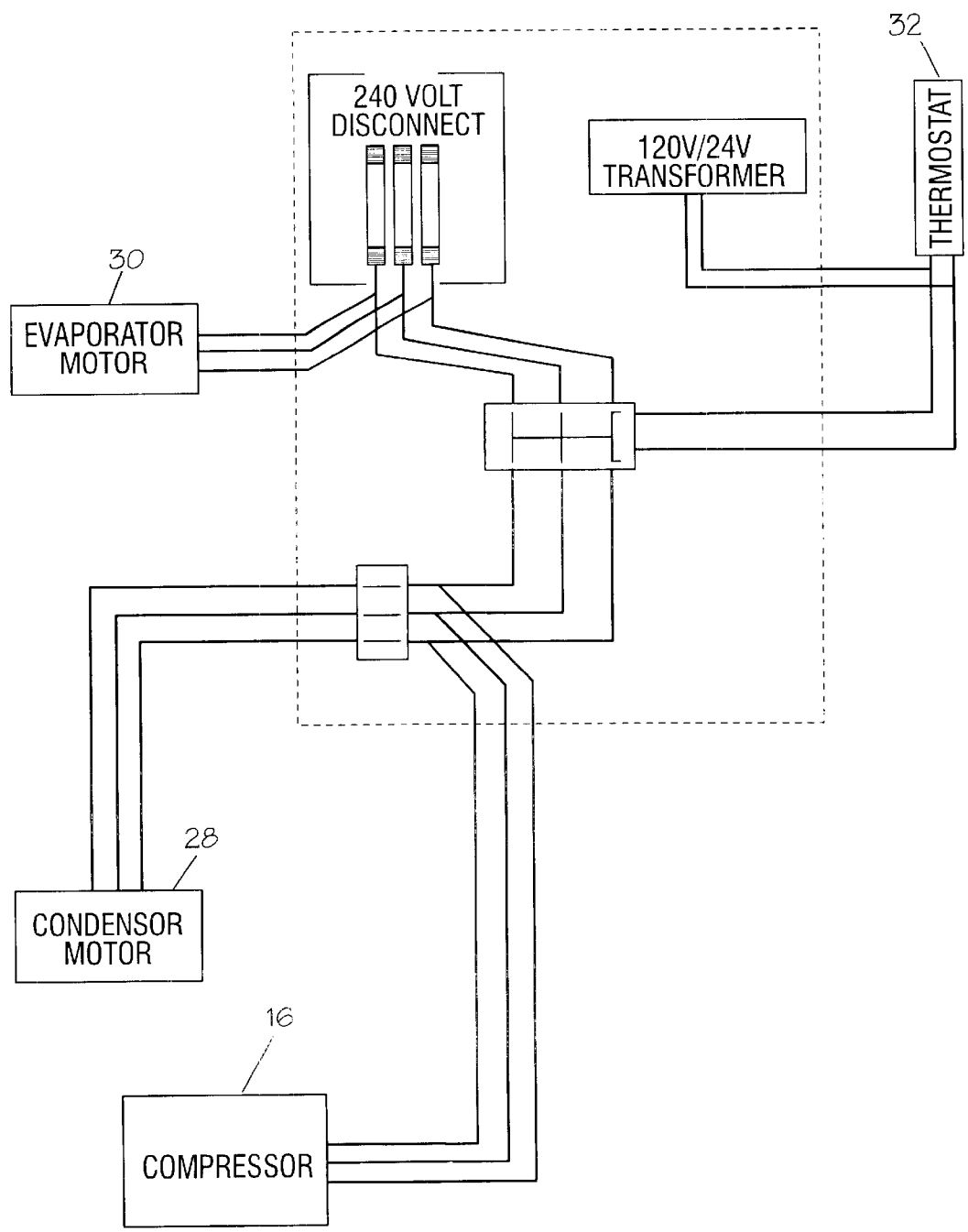
FIG. 5 is a schematic view of the relationship of components within the modular unit when used for refrigeration or freezing.

The portable unit 10 includes a modular cooling and heating unit 14 that is affixed to the platform 12, but is easily removed and separated from the portable unit 10 for cleaning or exchanging. Said modular cooling and heating unit 14 may also be referred to herein as a modular cooling unit or simply a modular unit. The modular unit 14 is particular advantageous in that it may be interchanged with a larger or smaller capacity modular unit 14 according to the needs of the user. The modular unit 14 comprises basic cooling components similar to those used in a home air conditioning window unit. These components include a compressor 16, a condenser 18, a condenser fan 20, a receiver 22, an evaporator 24, an evaporator fan 26, a condenser fan motor 28, an evaporator fan motor 30, and a thermostat 32. The operation and schematic relation of these components within the modular unit 14 are shown in detail in the schematic illustration of FIG. 5 showing the relationship of the various elements including the condenser arrangement, the evaporator arrangement, and other components. FIG. 4a illustrates the flow of fluids through a typical modular unit 14 arranged for refrigeration of the storage box 34. By reversing the flow of fluids through the modular unit 14 as shown in FIG. 4b, the unit may be used for heating the storage box 34.

A storage box 34 is arranged on the platform 12 in relation to the modular cooling unit 14 such that the operation of the modular unit 14 will control the temperature inside of the storage box 34. Operation of the modular cooling unit 14 is regulated by the thermostat 32. The coolant in the described modular unit 14 freezes very rapidly as a result of using a systemic approach like the systems used in home air conditioning units. Thus, unlike conventional refrigeration units, the modular unit 14 may cause the storage box 34 to reach a temperature of about 10 degrees in less than 30 minutes. However, the modular cooling unit 14 may also be regulated to provide a higher temperature as needed using the thermostat 32.

The storage box 34 may also be used for storing items such as cooked meats that need to be kept warm. By reversing the fluid flow in the cooling unit 14 as depicted in FIG. 4b, the compressor 16 serves as a heat pump, and, by adding a heating element 58, the modular unit becomes a modular heating unit for heating the storage box 14. Thus, the portable unit 10 is versatile according to the needs of the user.

Figure 2:
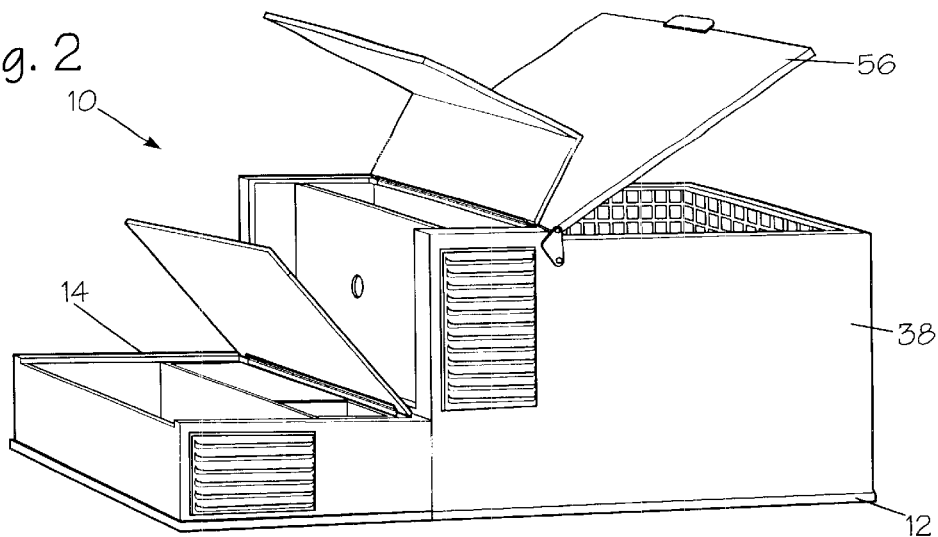
FIG. 2 is a rear perspective view of the portable conditioned storage unit.

The storage box 34 is attached to the platform 12 and rests thereon supported by several metal struts, preferably constructed of lightweight aluminum. The storage box 34 comprises an insulated wood structure including a floor 36, four side walls 38, and a top 40 that provides an insulated interior. Typically, the insulated box will be able to maintain a temperature below freezing three to four hours after a unit shuts off when the low temperature was previously reached. Either a side wall 38 or the top 40 may be designed to provide a door 56 that opens to insert items to be stored in the storage box 34. Alternatively, the top 40 could be left open for convenience in loading items, but with decreased efficiency. A cage 42 with a bottom 44 and four side walls 46 is attached within the storage box 14 in spaced relation to the inside surface and insulated interior provided by the side walls 38 of the storage box 34. As illustrated in FIG. 2, about two inches of space is left between the cage 42 and the walls 38 and the floor 36 of the storage box 14 for circulation of the conditioning air about the cage 42.

The cage 42 size will vary according to the design specifications of the portable unit 10. In a standard forty-eight (48) cubic foot portable unit up to five-hundred (500) pounds of material can be placed in the cage 42 and stored within the storage box 34. The portable units 10 could be designed with storage boxes 34 as large as eight feet by eight feet by sixteen feet or as small as three feet by three feet by one foot.

Accordingly, the portable unit 10 has a very flexible design and can be provided a number of optional components for incorporation into the modular unit 14. Typical options that will be included in the modular unit 14 include a hot or cold water supply tank 48 and water pump that will be useful for cleaning or providing drinking water. Further, a sink or wash basin connected to the water supply may be incorporated, as well as eye burners of electric or gas for cooking. Finally, an unconditioned storage container may be incorporated into the modular cooling unit, and an ice maker may be added into the refrigerated storage box.

Figure 3:
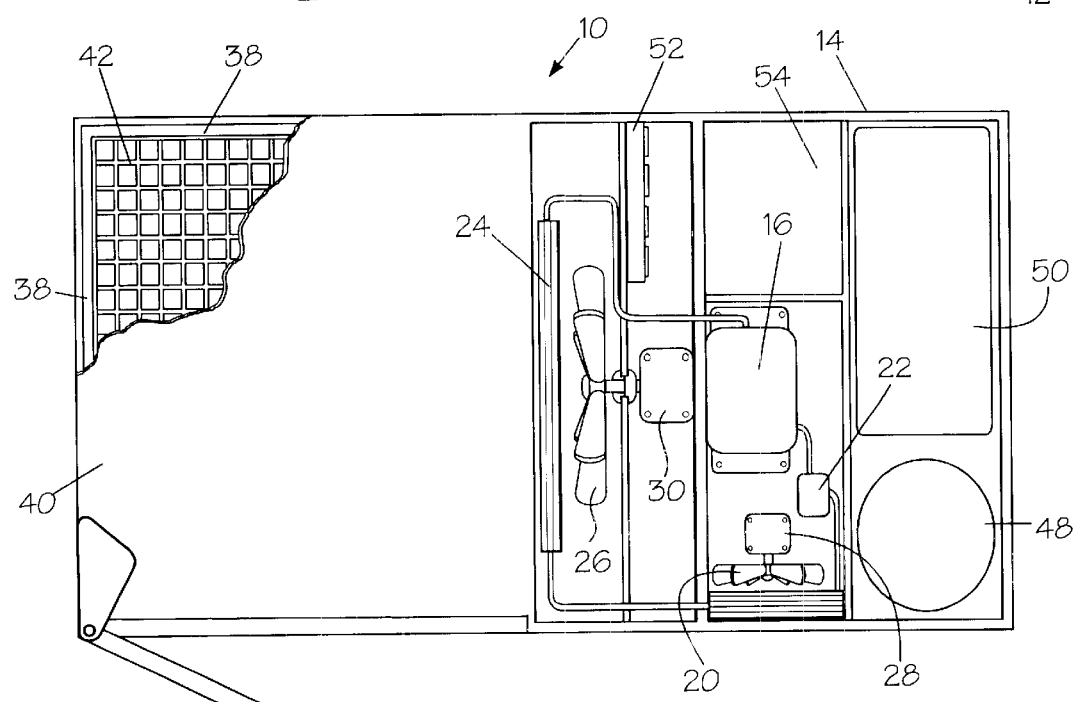
FIG. 3 is a top elevational view of the portable conditioned storage unit and modular heating and cooling unit according to one embodiment of the invention.

As shown in FIG. 3, a gas generator 50 may also be incorporated into the modular unit 14 to provide a power source for the portable unit 10. The schematic view depicted in FIG. indicates the provision of electric power to the modular cooling unit via an electrical control panel 52 or a sufficient battery, depending upon the size and use of the unit.

From the foregoing description of the illustrative embodiments of the invention, it will be apparent that many modifications may be made therein. It should be understood therefore that these embodiments of the invention are intended as an exemplification of the invention only and that the invention is not limited thereto. It is to be understood, therefore, that it is intended that the claims are to cover all such modifications that will fall within the true spirit and scope of the invention.

We claim:

1. A portable conditioned storage unit comprising:
   a. a transportable storage box having an insulated interior;
   b. a modular unit removably attached to the storage box for selectively cooling or heating air within the insulated interior of the storage box;
   c. a cage attached within the storage box in spaced relation of more than two inches between the cage and to the insulated interior for storing goods;
   d. a power source for supplying power to the modular unit.

2. A portable conditioned storage unit as set forth in claim 1 in which said modular unit includes a compressor, a condenser arrangement, a receiver, and an evaporator arrangement through which a fluid flows.

3. A portable conditioned storage unit as set forth in claim 2 in which said fluid flows through said compressor, condenser arrangement, receiver, and evaporator in such manner as to provide refrigeration to said storage box.

4. A portable conditioned storage unit as set forth in claim 1 in which said cage is comprised of metal wire.

5. A portable conditioned storage unit as set forth in claim 1 in which said power source is a gas generator contained within said modular unit.

6. A portable conditioned storage unit as set forth in claim 1 in which said modular unit includes a thermostat for regulating the temperature of said insulated interior of said storage box.

7. A portable conditioned storage unit as set forth in claim 1 in which said storage box is mounted on a platform for transport by a vehicle.

8. A portable conditioned storage unit comprising:
   a. a transportable storage box having an insulated interior;
   b. a modular unit, which includes a compressor, a condenser arrangement, a receiver, and an evaporator arrangement through which a fluid flows, removably attached to the storage box for selectively cooling or heating air within the insulated interior of the storage box;

c. said modular unit includes a heating element and said fluid flows through said compressor in reverse such that said compressor performs as a heat pump to provide heating to said storage box;

d. a cage attached within the storage box in spaced relation to the insulated interior for storing goods, e. a power source for supplying power to the modular unit.

9. A portable conditioned storage unit as set forth in claim 8 in which said fluid flows through said compressor, condenser arrangement, receiver, and evaporator in such manner as to provide refrigeration to said storage box.

10. A portable conditioned storage unit as set forth in claim 8 in which said modular unit includes a thermostat for regulating the temperature of said insulated interior of said storage box.

11. A portable conditioned storage unit as set forth in claim 8 in which said storage box is mounted on a platform for transport by a vehicle.

12. A portable conditioned storage unit comprising:

a. a transportable storage box having an insulated interior;

b. a modular unit removably attached to the storage box for selectively cooling or heating air within the insulated interior of the storage box;

c. said modular unit includes an accessory water supply apparatus;

d. a cage attached within the storage box in spaced relation to the insulated interior for storing goods, e. a power source for suppling power to the modular unit.

* * * * *